(12) United States Patent
Hamaguchi et al.

(10) Patent No.: US 9,792,401 B2
(45) Date of Patent: Oct. 17, 2017

(54) INSULATION DISTANCE CHECK DEVICE

(71) Applicant: Hitachi, Ltd., Tokyo (JP)

(72) Inventors: Takashi Hamaguchi, Tokyo (JP); Makoto Onodera, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 80 days.

(21) Appl. No.: 14/694,289

(22) Filed: Apr. 23, 2015

(65) Prior Publication Data

US 2015/0331986 A1    Nov. 19, 2015

(30) Foreign Application Priority Data

May 13, 2014    (JP) ................................. 2014-099211

(51) Int. Cl.
*G06F 17/50*    (2006.01)
*H05K 3/00*    (2006.01)

(52) U.S. Cl.
CPC ...... *G06F 17/5081* (2013.01); *G06F 17/5018* (2013.01); *G06F 17/5072* (2013.01); *H05K 3/0005* (2013.01); *G06F 2217/06* (2013.01)

(58) Field of Classification Search
CPC ............. G06F 17/5081; G06F 17/5018; G06F 17/5072; G06F 2217/06; H05K 3/0005
USPC ........................................................ 716/137
See application file for complete search history.

(56) References Cited

U.S. PATENT DOCUMENTS

| | | | | | |
|---|---|---|---|---|---|
| 6,002,650 | A | * | 12/1999 | Kuribayashi | ...... G05B 19/4097 29/703 |
| 7,886,249 | B2 | * | 2/2011 | Fujimura | ............ G06F 17/5068 716/137 |
| 8,097,815 | B2 | * | 1/2012 | Watanabe | .............. H05K 1/114 174/262 |
| 8,683,422 | B2 | * | 3/2014 | Nojima | ............... G06F 17/5068 716/136 |
| 2009/0113362 | A1 | * | 4/2009 | Lerner | ................ H01L 27/0207 716/51 |

(Continued)

FOREIGN PATENT DOCUMENTS

| | | |
|---|---|---|
| JP | 2003-256498 A | 9/2003 |
| JP | 2005-10835 A | 1/2005 |

(Continued)

*Primary Examiner* — Jack Chiang
*Assistant Examiner* — Brandon Bowers
(74) *Attorney, Agent, or Firm* — Mattingly & Malur, PC

(57) ABSTRACT

The insulation distance check device comprising: a unit which designates a high potential component, a conductive component and an insulation component to 3D CAD data; a unit which designates a distance condition; a unit which superimposes a layer surrounding the high potential component and creates a layer map associating the layer with a first distance; a unit which determines a second distance associated with the layer contacting with a portion of the conductive component, the second distance being a distance between the high potential component and the portion of the conductive component; a unit which compares the second distance and the distance condition; and a unit which displays at least one of a region occupied by the portion of the conductive component, on which the second distance having been determined to dissatisfy the distance condition is based; and a path connecting the high potential component and the conductive component.

19 Claims, 16 Drawing Sheets

(56) References Cited

U.S. PATENT DOCUMENTS

| | | | |
|---|---|---|---|
| 2010/0237492 A1* | 9/2010 | Sasaki | H01L 23/49838 257/692 |
| 2016/0117431 A1* | 4/2016 | Kim | G06F 17/5072 716/119 |
| 2016/0154919 A1* | 6/2016 | Nishio | G06F 17/5068 716/137 |

FOREIGN PATENT DOCUMENTS

| | | |
|---|---|---|
| JP | 2005-18664 A | 1/2005 |
| JP | 2013-122731 A | 6/2013 |

\* cited by examiner

113

| Component | Attribute ID | Attribute Name |
|---|---|---|
| Component A | 1 | Conductive component |
| Component B | 2 | Insulation component |
| Component C | 3 | High potential component |
| Component D | 1 | Conductive component |

| Point identification number | X-coordinate [mm] | Y-coordinate [mm] | Z-coordinate [mm] |
|---|---|---|---|
| 1 | 0.0 | 0.0 | 0.0 |
| 2 | 0.0 | 1.0 | 0.0 |
| 3 | 1.0 | 1.0 | 0.0 |

| Surface identification No. | Point 1 | Point 2 | Point 3 | Point 4 |
|---|---|---|---|---|
| 1 | 1 | 2 | 3 | 4 |
| 2 | 8 | 9 | 10 | 11 |
| 3 | 12 | 13 | 14 | 15 |

| Cell identification number | Surface 1 | Surface 2 | Surface 3 | Surface 4 | Surface 5 | Surface 6 |
|---|---|---|---|---|---|---|
| 1 | 1 | 2 | 3 | 4 | 20 | 21 |
| 2 | 8 | 9 | 10 | 11 | 24 | 25 |
| 3 | 12 | 13 | 14 | 15 | 28 | 29 |

| Cell identification number | Component |
|---|---|
| 1 | Component A |
| 2 | Component A |
| 3 | Component A |

| Cell number | Layer No. |
|---|---|
| 1 | 1 |
| 2 | 1 |
| 3 | 2 |
| 4 | 3 |

| Layer No. | Distance [mm] |
|---|---|
| 1 | 0.40~0.60 |
| 2 | 0.61~0.80 |
| 3 | 0.90~1.10 |
| 4 | 1.30~1.50 |

INSULATION DISTANCE CHECK DEVICE

BACKGROUND OF THE INVENTION

1. Field of the Invention

This invention relates to an insulation distance check device to assist an insulation distance check at the time of designing an electric product. Priority is claimed on Japanese Patent Application No. 2014-099211, filed May 13, 2014 the content of which is incorporated herein by reference.

2. Description of the Related Art

Conventionally, at the time of designing an electric product, a distance between a conductive component and a component having a different potential from the conductive component (hereinafter, referred to as a high potential component) has been determined by measuring both a spatial distance of a shortest spatial path between a high potential component and a conductive component and a creepage distance of a shortest path along a solid surface by a ruler or a function of 3D CAD to measure a distance between components with use of a calculator or spreadsheet software (For example, refer to the patent document 1: Japanese Patent Application Publication No. 2013-122731).

Also, conventionally, an insulation verification system for reducing the time for product development or product design has been proposed as a technology to measure a creepage distance (For example, refer to the patent document 2: Japanese Patent Application Publication No. 2005-10835).

SUMMARY OF THE INVENTION

Conventionally, at the time of designing an electric product, a distance between a conductive component and a component having a different potential from the conductive component has been determined by measuring both a spatial distance of a shortest spatial path and a creepage distance of a shortest path along a solid surface by a ruler or a function of 3-Dimensional Computer Aided Design (hereinafter, referred to as 3D CAD) to measure a distance between components with use of a calculator or spreadsheet software.

The patent document 1 discloses technologies to display the spatial path or the creepage path. In particular, this document discloses an electric verification device capable of conducting a data-based electric verification.

When there is an insulation component between a high potential component and a conductive component, the electric verification device determines a shortest path bypassing the insulation component, and when there is a first conductive component between a high potential component and a second conductive component, it determines a shortest path between the high potential component and the first conductive component, calculates a distance between a starting point and an ending point of the determined path and conducts verification by comparing the determined distance with an insulation distance condition with use of verification data consisting of model data and constitution data, wherein the model data represents an arrangement position and three-dimensional shape of each component constituting an electric device consisting of an electric board and a chassis and wherein the constitution data represents an attribute.

The patent document 2 discloses a technology to measure a creepage distance. In particular, this document describes an insulation verification system capable of reducing the time for product development or product design. This insulation verification system consists of a plurality of members, determines a weighted shortest creepage path between two points (a point on a high potential component and a point on a conductive component), determines a distance of the determined path, and conducts verification by comparing the determined distance with an insulation distance condition, with use of information on shapes of members constituting a device wherein there is a potential difference between predetermined components, information on assembly of each member, information on application of power to each member and information related to materials constituting each member.

However, the conventional insulation distance check device described in the patent document 1 displays only a shortest distance, and cannot comprehensively display paths not satisfying an insulation distance condition. Also, if a shortest distance between a high potential component and a conductive component (if there is an insulation component between the high potential component and the conductive component, a shortest distance bypassing the insulation component) is determined by means of path search like the way disclosed in the patent document 1 or the patent document 2, a shortest distance between a point on a component and a point on another component shall be searched for all possible combination of components in order to comprehensively determine all paths not satisfying an insulation condition, and this could require enormous amount of calculation for the search.

Failing to comprehensively display all paths not satisfying an insulation distance condition leads to repetitive design change and insulation distance verification. For example, suppose that a design change to add an insulation component only at a neighborhood of a shortest path between a high potential component and a conductive component has been made to minimize cost increase. In this case, if a path not satisfying an insulation distance condition is found after the design change to be a shortest path, another design change is needed. The same thing happens when a design change to change a shape of a conductive component is made.

As mentioned above, if a design change is conducted focusing only on a shortest path or a shortest distance, a path other than the shortest path may not satisfy a distance condition, thus repetitive design changes are needed. For this reason, a system capable of calculating an appropriate insulation distance condition while preventing repetitive design change and insulation distance verification is required.

In order to solve the problem mentioned above, for example, the insulation distance check device of the present invention comprises: a component designation section designating a high potential component, a conductive component and an insulation component to 3D CAD data; a distance condition providing section providing a distance condition associated with a first distance between at least two components among the high potential component, the conductive component and the insulation component; a layer map creation section superimposing on the 3D CAD data a layer spatially surrounding the high potential component and creating a layer map which associates the layer with the distance; a conductive component-associated distance determination section determining a second distance associated with the layer contacting with a portion of the conductive component, the second distance being a distance between the high potential component and the portion of the conductive component; a distance condition comparison section comparing the second distance determined by the conductive component-associated distance determination section with the distance condition; and a display section displaying at least one of a path connecting the high potential component and the conductive component and a region occupied by the portion of the conductive component, on which the second distance having been determined to dissatisfy the distance condition is based.

This invention enables to provide a system capable of calculating an appropriate insulation distance condition while reducing man-hour for design change and an insulation distance check by comprehensively displaying paths on a surface of the conductive component not satisfying an insulation condition.

BRIEF DESCRIPTION OF THE DRAWINGS

FIG. 13 illustrates an example mesh data of the insulation distance check device of the present invention.

DESCRIPTION OF THE PREFERRED EMBODIMENTS

Figure 1:
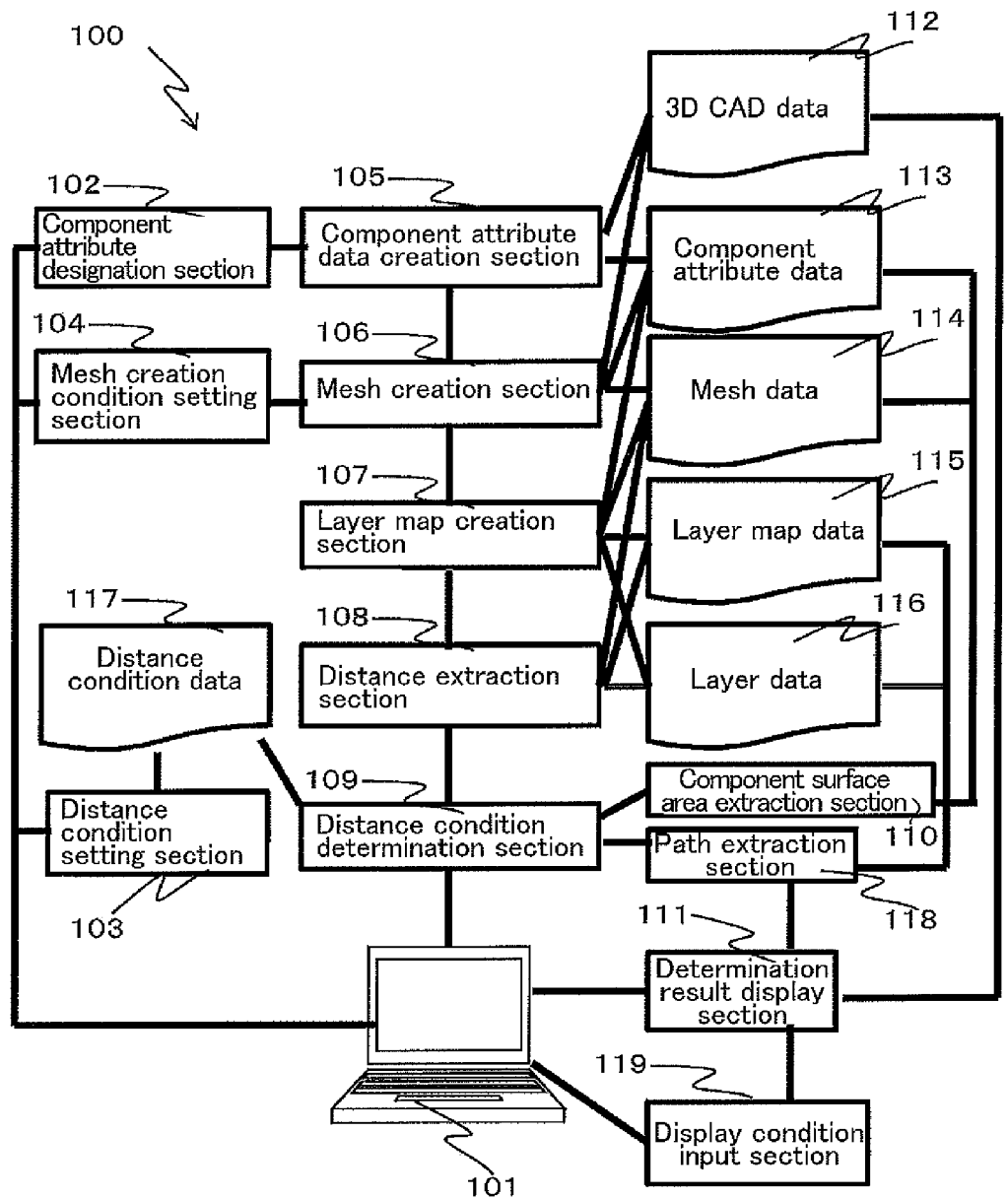
FIG. 1 illustrates an example configuration of an insulation distance check device of the present invention.

An embodiment of an insulation distance check device of the present invention will be described as follows. First, a technical outline of the insulation distance check device of the present invention will be briefly explained. The insulation check device of the present invention assists an insulation distance check at the time of designing an electric product, and as mentioned above, comprises for example a component designation section designating a high potential component, a conductive component and an insulation component to 3D CAD data; a distance condition providing section providing a distance condition which is associated with a first distance between at least two components among the high potential component, the conductive component and the insulation component; a layer map creation section superimposing on the 3D CAD data a layer surrounding the high potential component and creating a layer map associating the layer with the distance; a conductive component-associated distance determination section determining a second distance associated with the layer contacting with a portion of the conductive component, the second distance being a distance between the high potential component and the portion of the conductive component; a distance condition comparison section comparing the second distance determined by the conductive component-associated distance determination section with the distance condition; and a display section displaying at least one of a path connecting the high potential component and the conductive component and a region occupied by the portion of the conductive component, on which the second distance having been determined to dissatisfy the distance condition is based. Or the insulation distance check device, for example, comprises a unit which designates a high potential component, a conductive component and an insulation component to 3D CAD data; a unit which designates a distance condition or a unit which determines a distance condition by designating an electric condition; a unit which superimposes on the 3D CAD data a layer surrounding the high potential component and creates a layer map associating the layer with a first distance; a unit which determines a second distance contacting with a portion of the conductive component, the second distance being a distance between the high potential component and the portion of the conductive component; a unit which compares the second distance with a distance condition; and a unit which displays a region occupied by the portion of the conductive component, on which the second distance having been determined to dissatisfy the distance condition is based. Also, since it is possible to comprehensively display a shortest path and paths not satisfying an insulation distance condition, all areas in need of modification can be identified with single insulation distance verification in some cases.

An embodiment of an insulation distance check device of the present invention will be described in detail as follows with reference to drawings.

An embodiment of the present invention will be described in detail with reference to FIG. 1 to FIG. 17.

Figure 2:
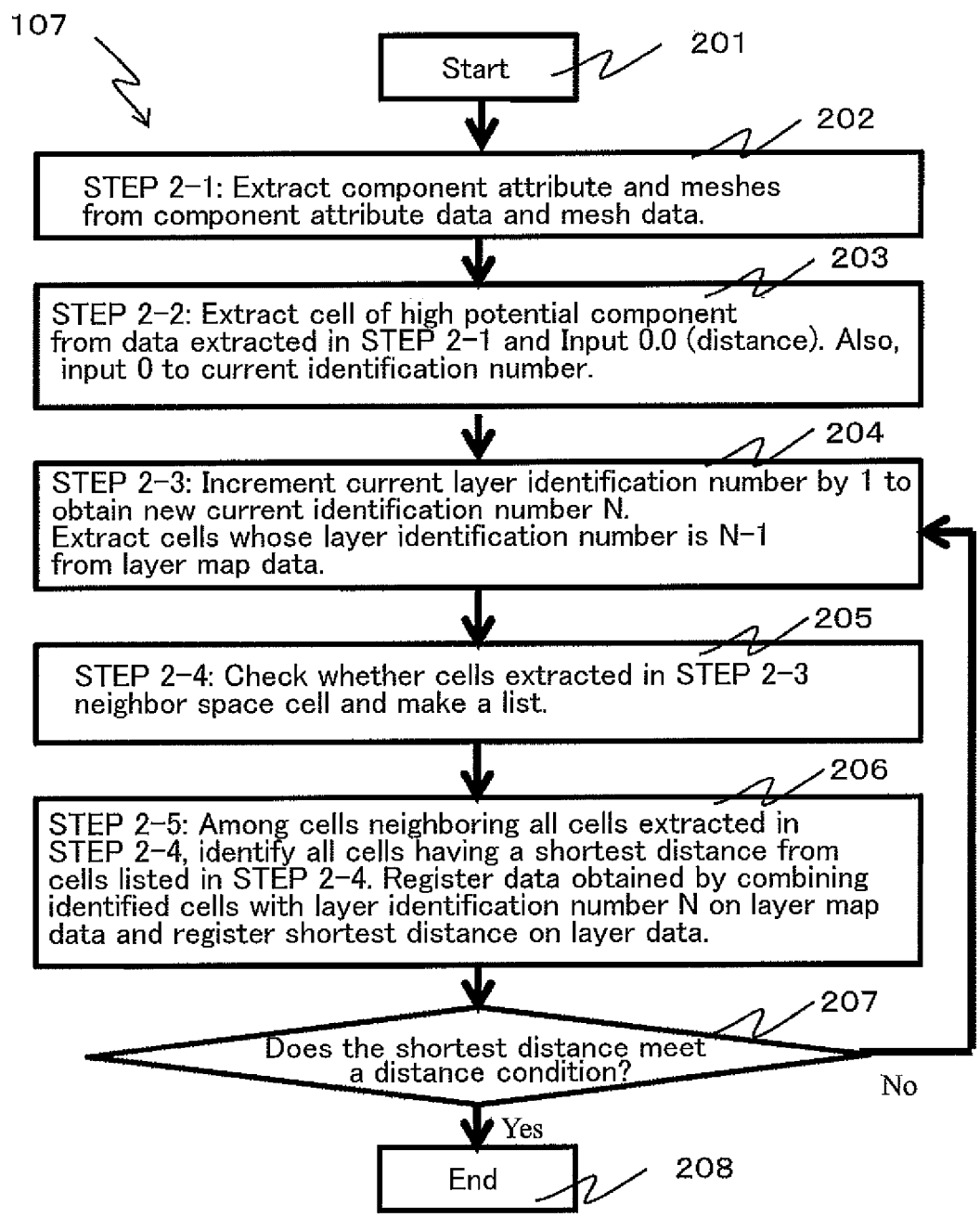
FIG. 2 is a flowchart explaining an example process of a layer map creation section in the insulation distance check device of the present invention.
Figure 3:
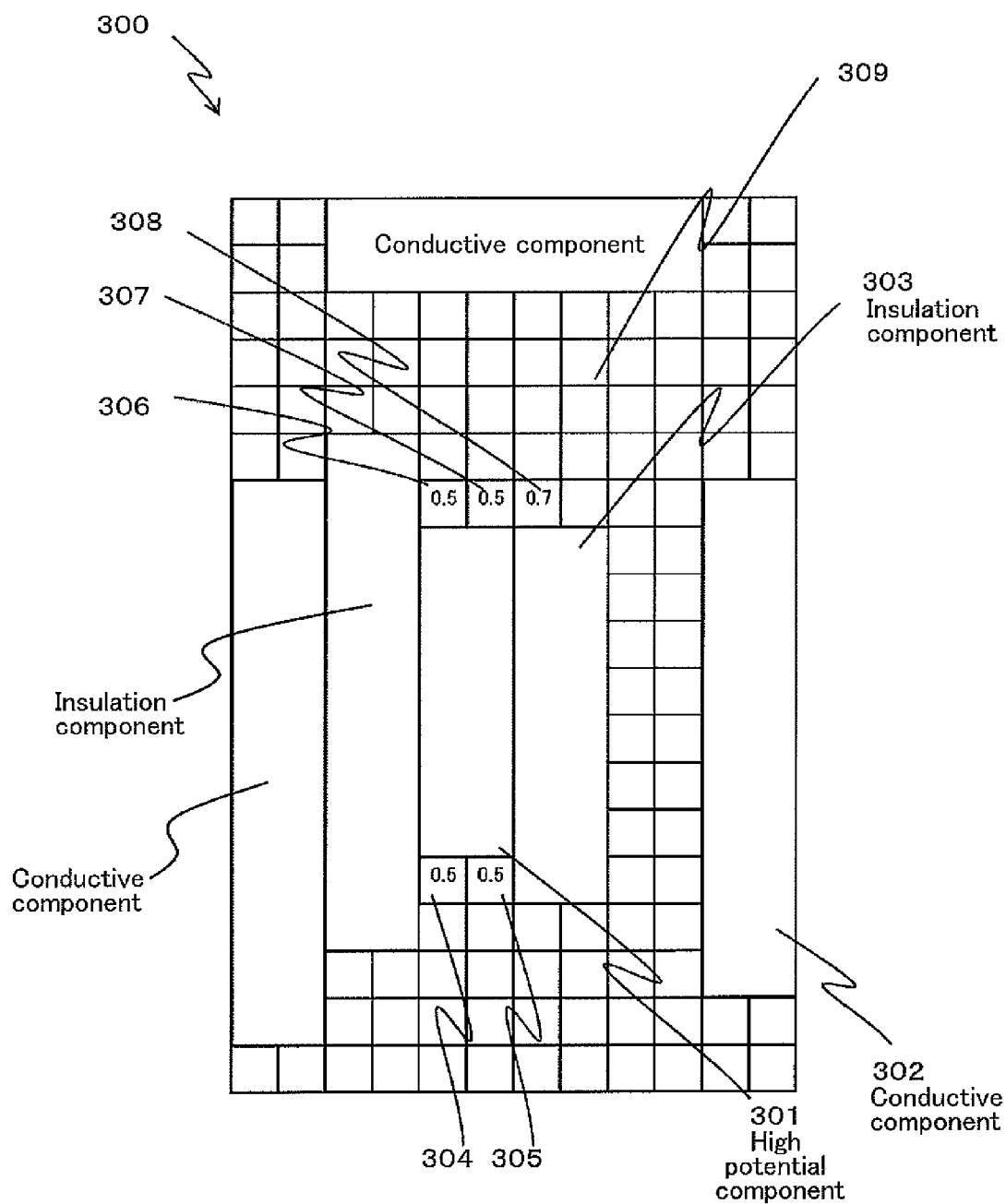
FIG. 3 illustrates an example of entering a distance in cells when the layer map creation section of the insulation check device of the present invention is in operation.
Figure 4:
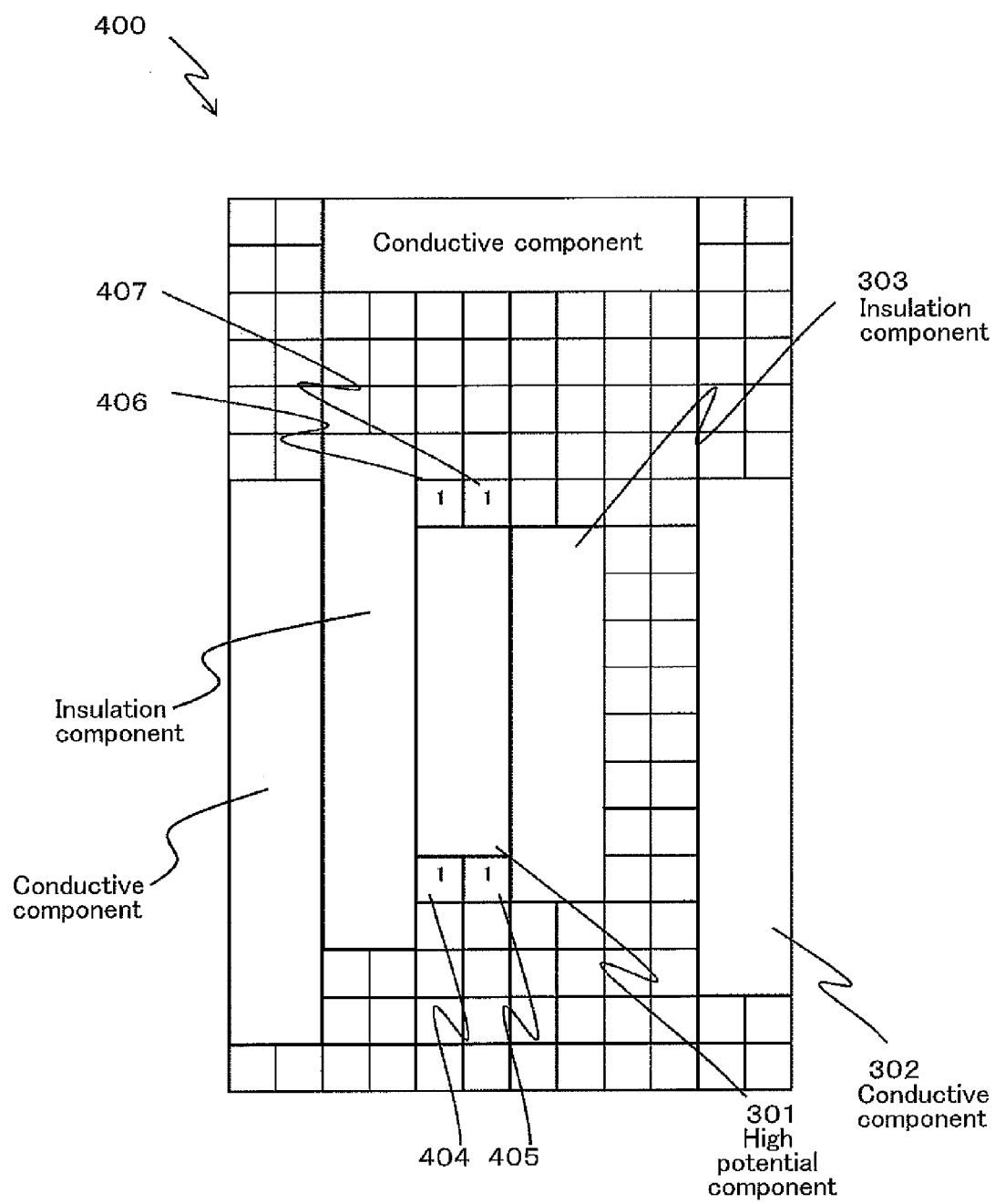
FIG. 4 illustrates an example of entering a layer identification number in cells when the layer map creation section of the insulation check device of the present invention is in operation.
Figure 5:
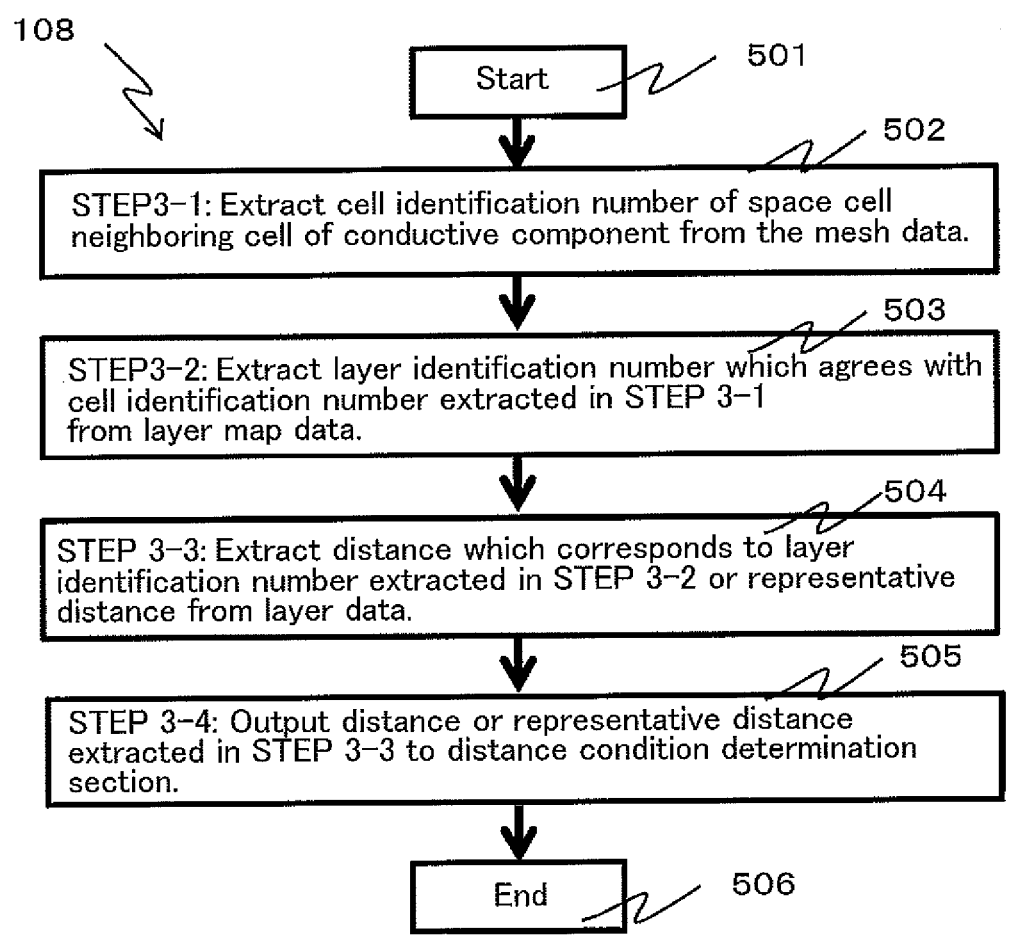
FIG. 5 illustrates a flowchart explaining an example process of the distance extraction section of the insulation distance check device of the present invention.
Figure 6:
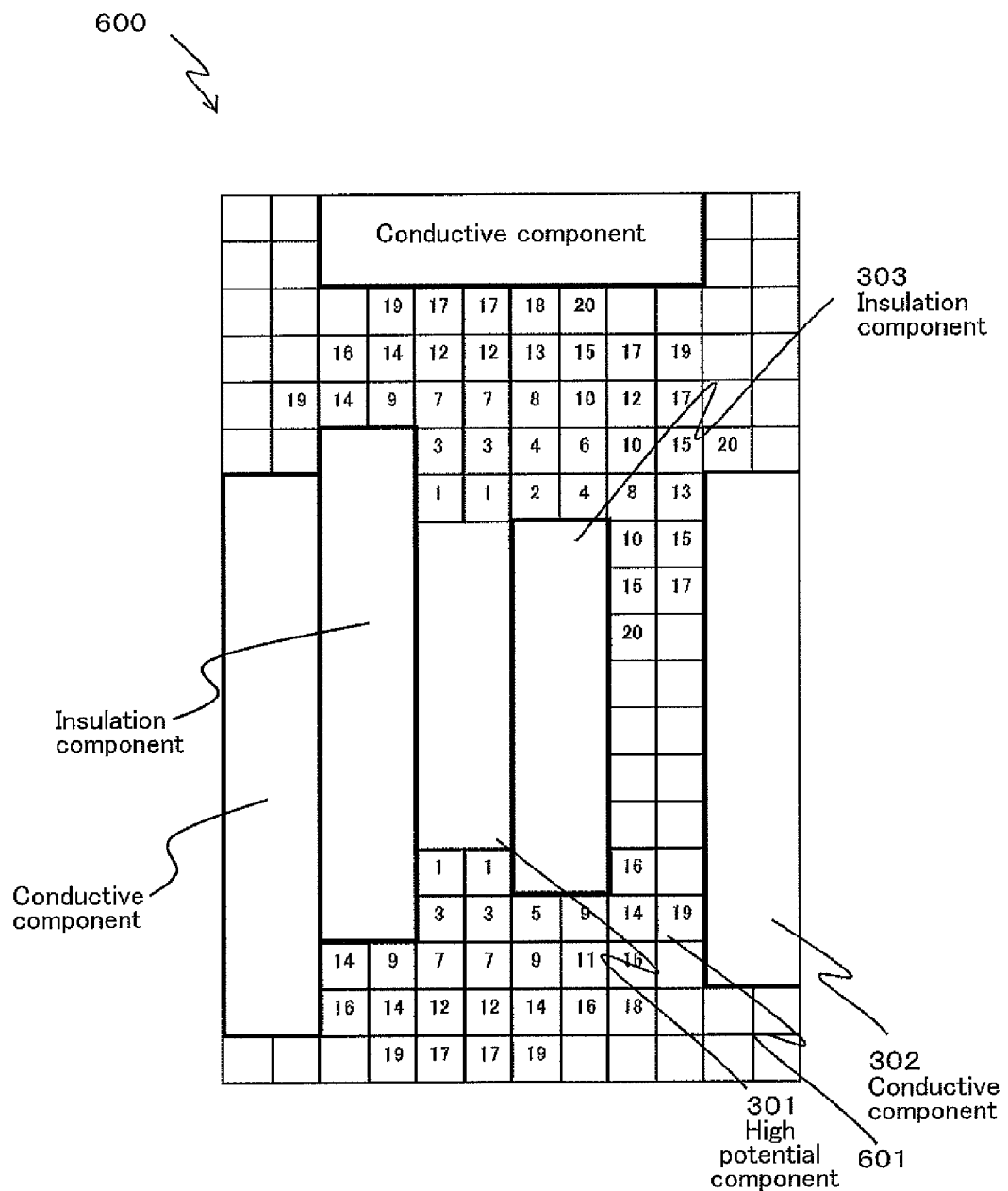
FIG. 6 illustrates an example of entering a distance in cells when the distance extraction section of the insulation distance check device is in operation.
Figure 7:
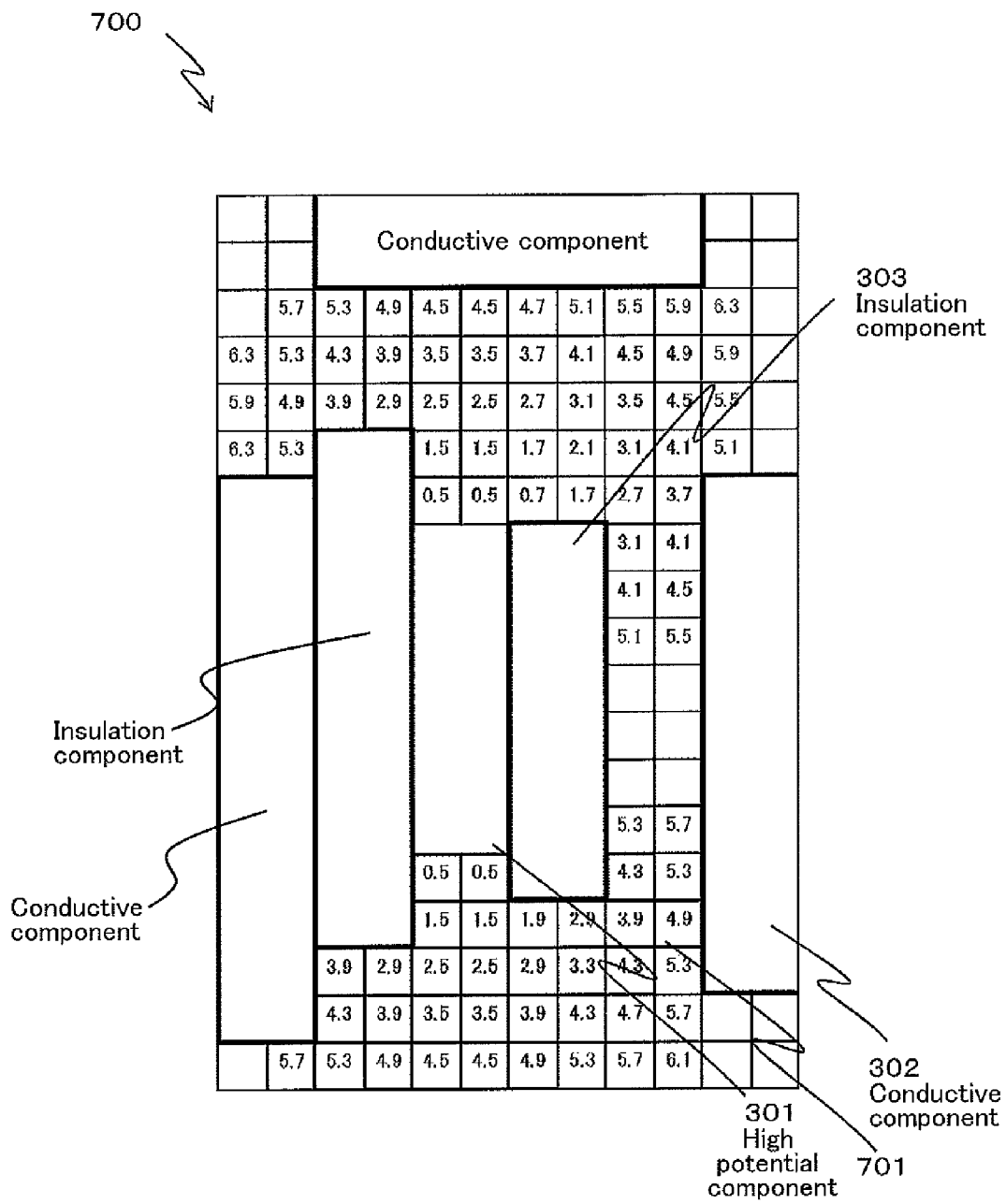
FIG. 7 illustrates an example of entering a layer identification number in cells when the distance extraction section of the insulation distance check device is in operation.
Figure 8:
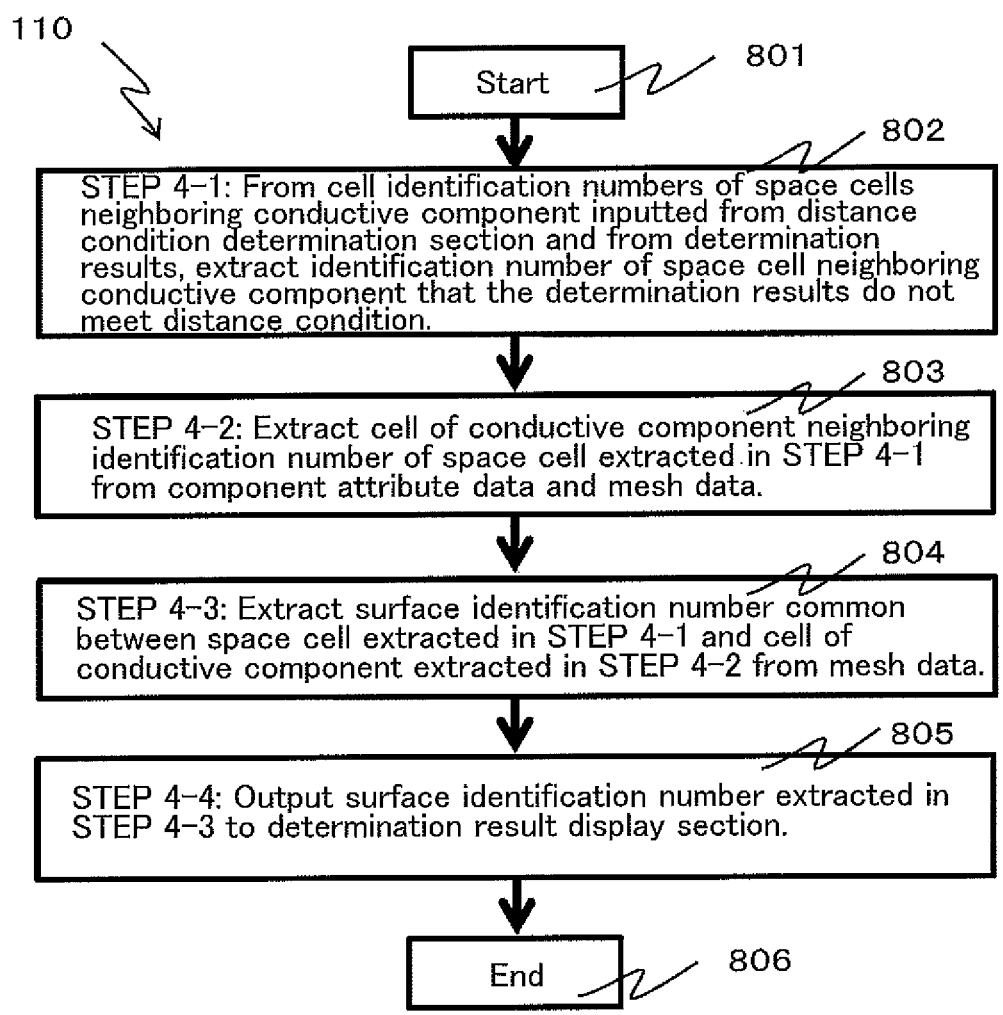
FIG. 8 illustrates a flowchart explaining an example process of a component surface area extraction section of the insulation distance check device of the present invention.
Figure 9:
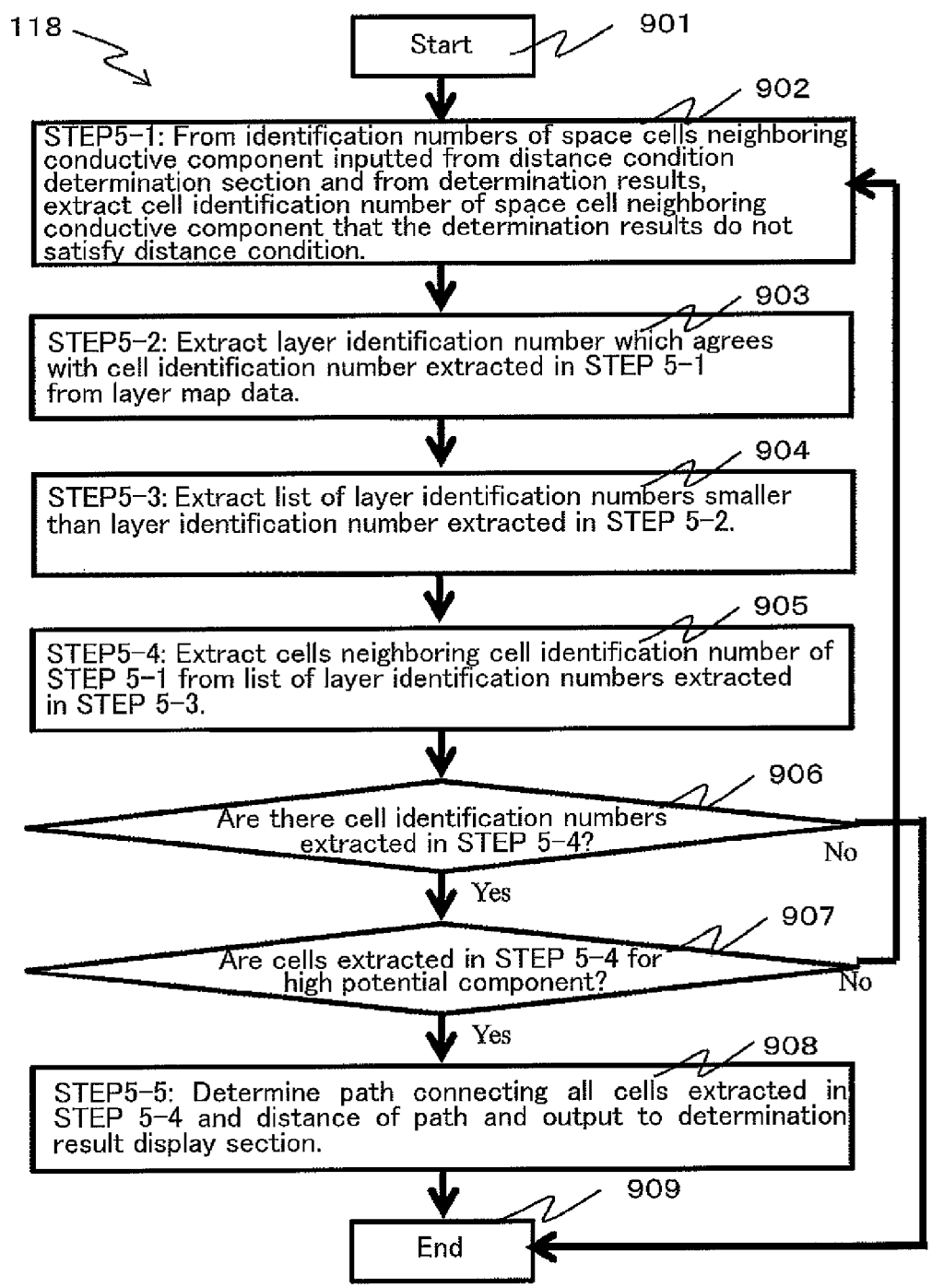
FIG. 9 illustrates a flowchart explaining an example process of a path extraction section of the insulation distance check device of the present invention.
Figure 10:
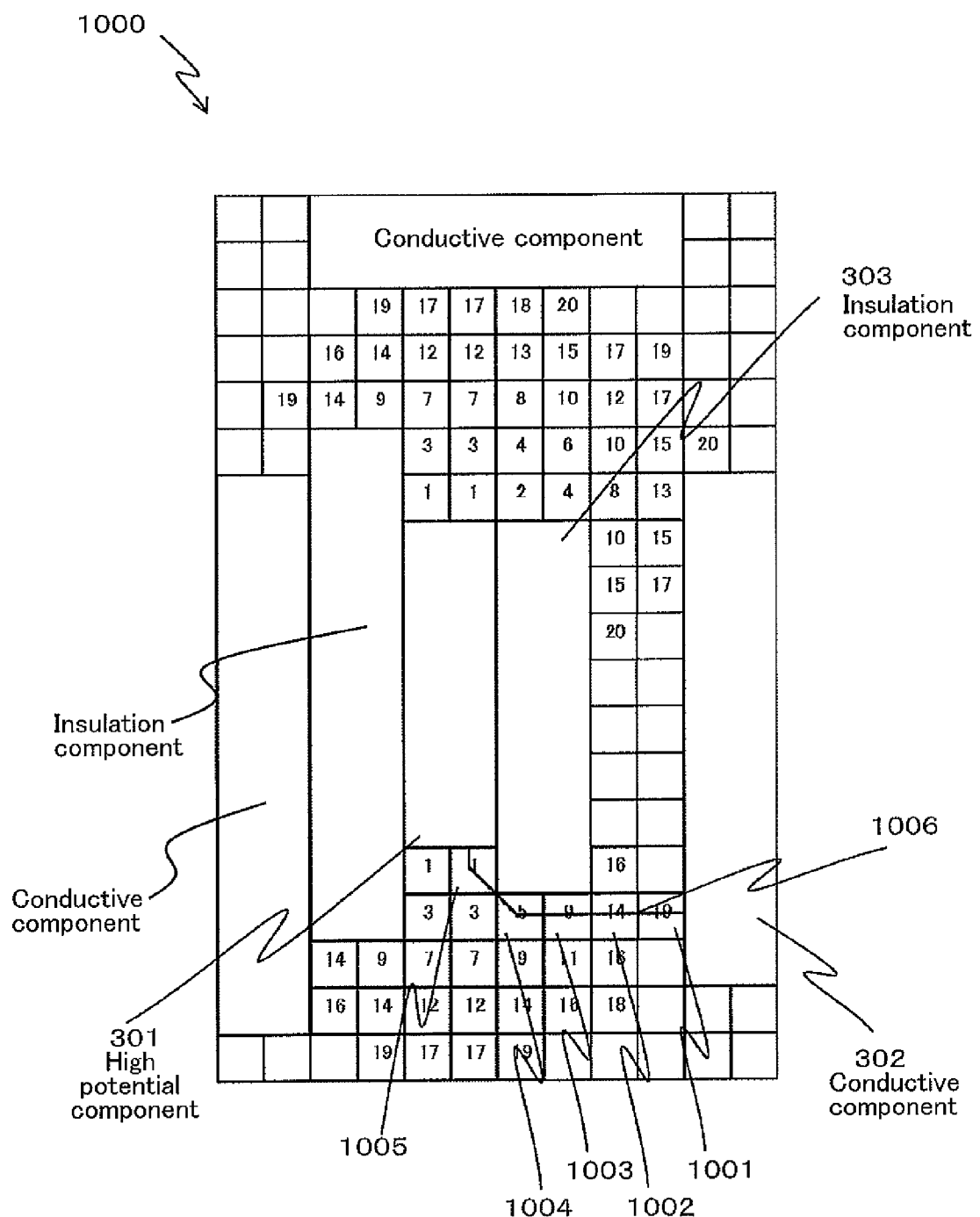
FIG. 10 illustrates an example of entering layer identification numbers and paths in cells when the path extraction section of the insulation distance check device of the present invention is in operation.
Figure 11:
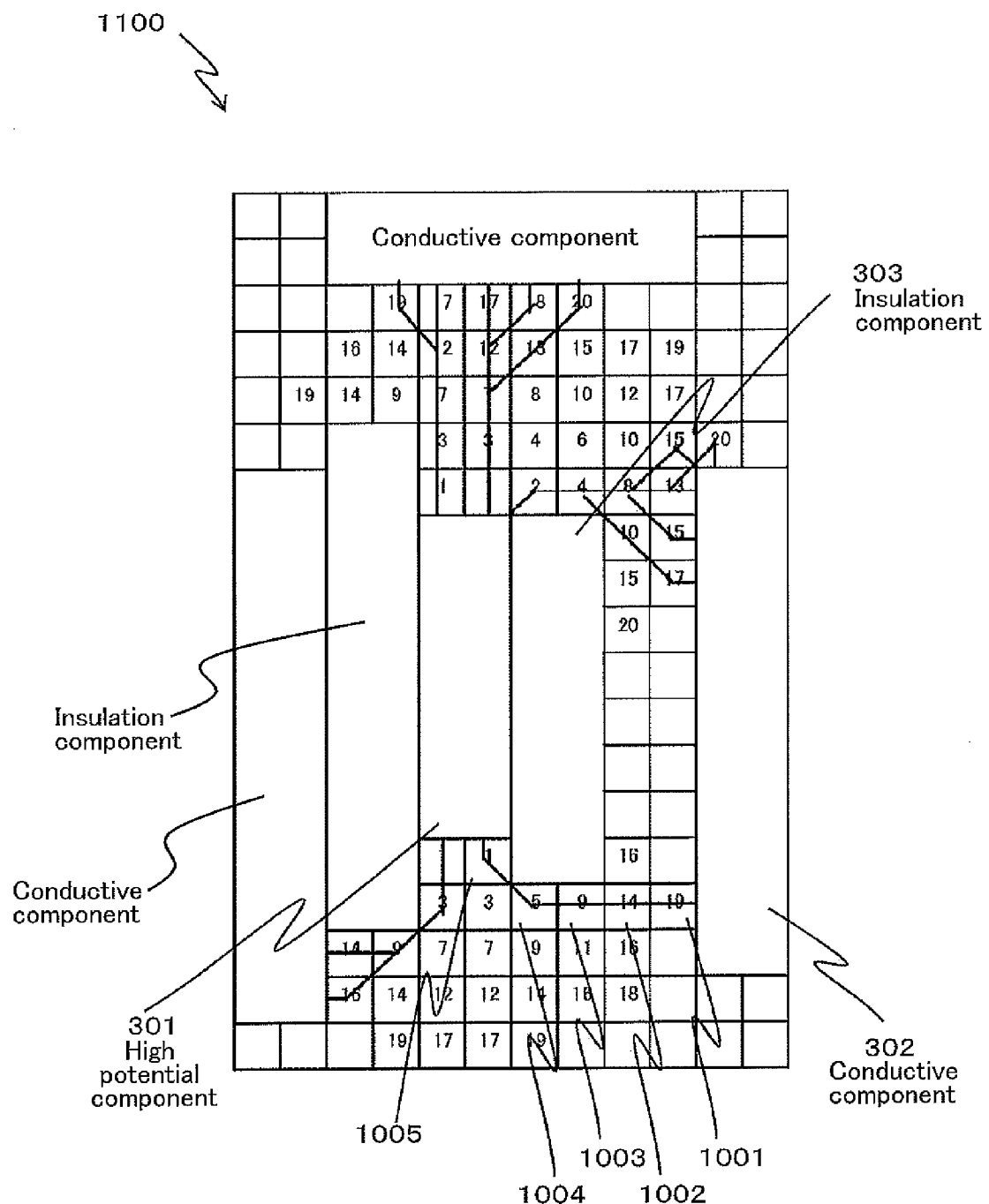
FIG. 11 illustrates an example of entering layer identification numbers and paths in cells after operation of the path extraction section of the insulation distance check device of the present invention.
Figure 12:
FIG. 12 illustrates an example component attribute data of the insulation distance check device of the present invention.
Figure 14:
FIG. 14 illustrates an example layer map data of the insulation distance check device of the present invention.
Figure 15:
FIG. 15 illustrates a layer data of the insulation distance check device of the present invention.
Figure 16:
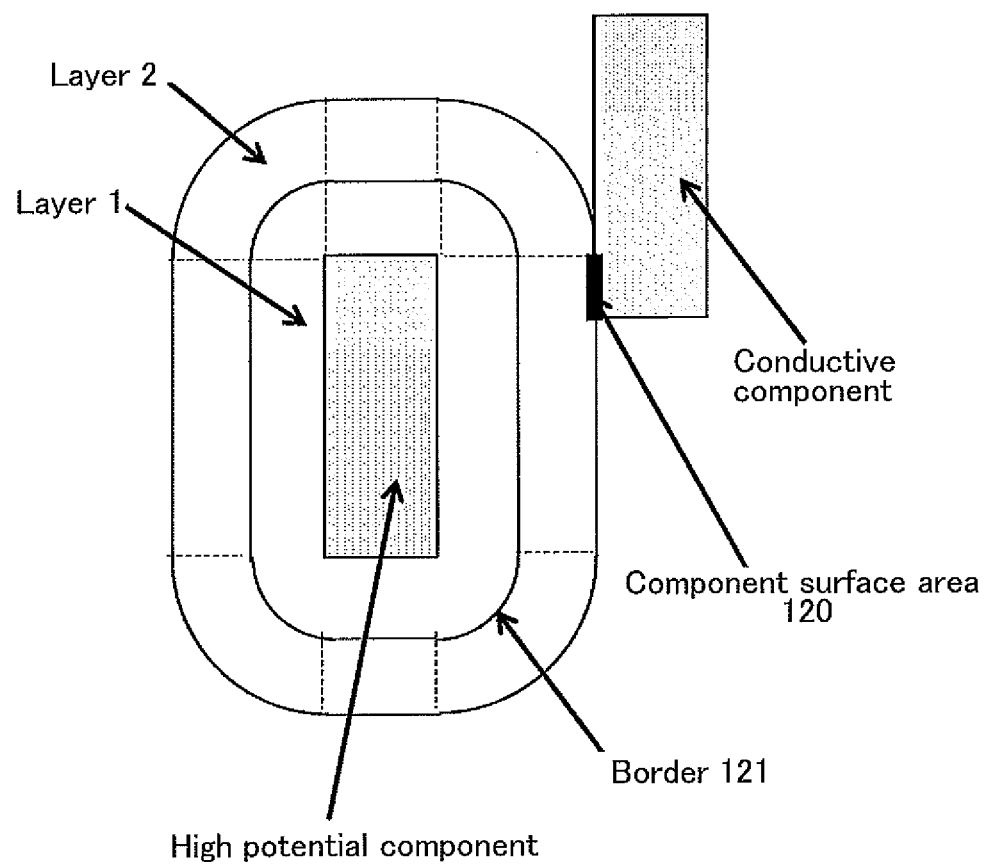
FIG. 16 illustrates an example illustrating two-dimensional component surface area not satisfying a distance condition with respect to the insulation distance check device of the present invention.
Figure 17:
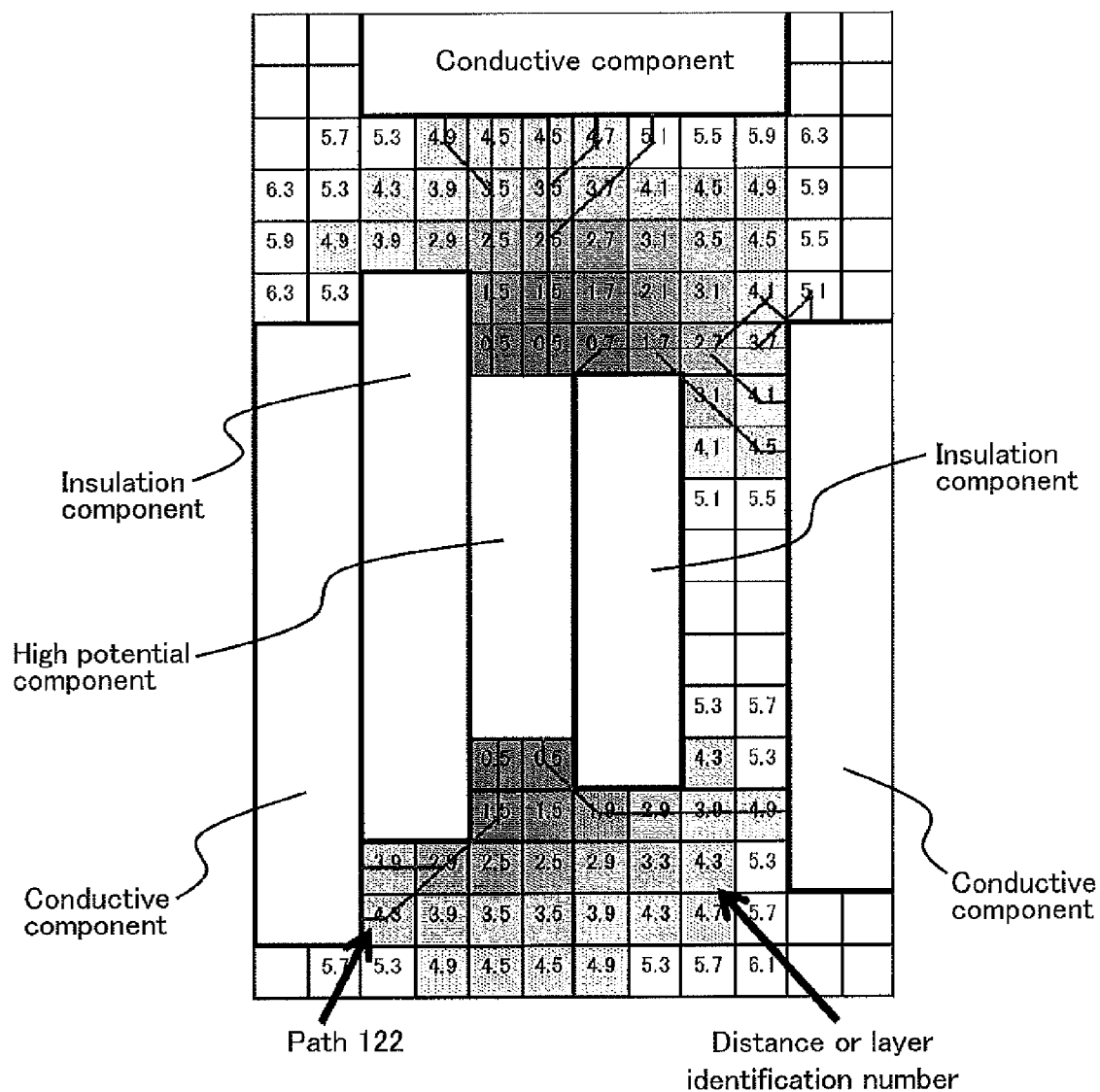
FIG. 17 illustrates an example of two-dimensional paths not satisfying distance conditions in the insulation distance check device of the present invention.

FIG. 1 illustrates an example configuration of an insulation distance check device 100 according to an embodiment 1 of the present application. FIG. 2 is an example flowchart explaining the processes of a layer map creation section 107. FIG. 3 is an example of entering a distance in cells when a layer map creation section is in operation. FIG. 4 is an example of entering a layer identification number in cells when a layer map creation section is in operation. FIG. 5 is an example flowchart explaining the processes of a distance extraction section 108. FIG. 6 is an example of entering a distance in cells when a distance extraction section is in operation. FIG. 7 is an example of entering a layer identification number in cells when a distance extraction section is in operation. FIG. 8 is an example flowchart explaining the processes of a component surface area extraction section 110. FIG. 9 is an example flowchart explaining the processes of a path extraction section 118. FIG. 10 is an example of entering a layer identification number and paths in cells when the path extraction section is in operation. FIG. 11 is an example of entering a layer identification number and a path on cells after operation of a path extraction section. FIG. 12 is an example of component attribute data. FIG. 13 is an example of mesh data. FIG. 14 is an example of a layer map data. FIG. 15 is an example of a layer data. FIG. 16 is an example two-dimensional display of a component surface area 120 not satisfying a distance condition (NG when within the external border (5 mm) of the layer 2). The border 121 shows a border obtained by connecting points which have a same distance from the high potential component. FIG. 17 is an example two-dimensional display of paths 122 not satisfying a distance condition The insulation distance check device is configured to include an input/output device 101 such as a keyboard, a mouse and a display for designating a component attribute such as a high potential component, a conductive component and an insulation component to 3D CAD data, providing an input to set a mesh creation condition and an insulation distance condition (hereinafter, referred to as a distance condition) and displaying insulation distance check results; a component attribute designation section 102 designating a high potential component, a conductive component and an insulation component; a unit which designates a distance condition or a distance condition input section 103 determining a distance condition by designating an electric condition; a mesh creation condition input section 104 inputting parameters necessary for creating meshes for components included in the 3D CAD data and for a space surrounding the components; a component attribute data creation section 105 registering a designated component attribute on the component attribute data; a mesh creation section 106 creating meshes for components included in the 3D CAD data and for a space surrounding the components; a layer map creation section 107 superimposing on the 3D CAD data a layer surrounding the high potential component and creating a layer map associating the layer with the distance; a distance extraction section 108 extracting a distance associated with the layer in contact with a conductive component; a distance condition determination section 109 determining whether the calculated distance satisfies a distance condition; a component surface area extraction section 110 extracting a surface area on a conductive component not satisfying a distance condition; a path extraction section 118 extracting paths not satisfying a distance condition; a display condition input section 119; and a result display section 111.

First, the component attribute designation section 102 will be explained. The component attribute designation section 102 prompts a user to designate a component attribute from any of a high potential component, a conductive component and an insulation component for each component included in 3D CAD data 112. Subsequent to designation of a component attribute by the user, the component attribute designation section 102 registers data obtained by combining a component included in the 3D CAD data with a component attribute on the component attribute data 113. With respect to the designation method by the component attribute designation section 102, two types of components out of the high potential component, the conductive component and the insulation component may be designated first, and subsequently, the component which has not been designated yet may be allocated to the remaining one type.

Next, the distance condition setting section 103 will be explained. The distance condition setting section 103 prompts a user to input a shortest spatial distance necessary for ensuring insulation. Subsequent to an input of a shortest spatial distance by the user, the shortest spatial distance is registered on the distance condition data 117. The input to the distance condition setting section 103 may be done in such a way as preparing data registered with a relationship between a distance condition and a voltage, a degree of stain on a surface or both, prompting the user to set a voltage or the degree of stain on the surface and extracting a distance condition by the distance condition setting section 103.

Next, the mesh creation condition section 104 will be explained. The mesh creation condition setting section 104 prompts the user to input a mesh creation area and a mesh size or a mesh division number. Subsequent to an input of a mesh creation condition, the mesh creation area and the mesh size or the mesh division number are inputted to the mesh creation section 106.

Next, the mesh creation section 106 will be explained. The mesh creation section 106 extracts 3D CAD data from the 3D CAD data 112 and extracts component attribute data from the component attribute data 113. Also, it creates meshes based on a mesh creation area and a mesh size or a mesh division number inputted from the mesh creation condition setting section 104 and register the meshes on the mesh data 114. A relationship between a cell identification number and a component identification number of the 3D CAD data is included in the mesh data 114. Hereinafter, with respect to an attribute of a cell (a high potential component, a conductive component and an insulation component), a component identification name is identified by a cell identification number, and a component attribute is determined by the component identification name based on the component attribute data 113.

The meshes may consist of not only a group of cubic cells, but also a group of hexahedron or tetrahedron or a combination of both. Creating orthogonal lattice-type meshes without gaps enables to determine whether or not multiple cells neighbor one another. Thus, determination of neighboring cells through contact decision is unnecessary, and calculation cost can be reduced.

Next, the layer map creation section 107 will be explained. The layer map creation section 107 sets a layer identification number corresponding to a distance from a high potential component for a cell of a mesh inputted from the mesh data 114, and a relationship between the layer identification number and the distance is registered on a layer data 116. Detailed explanation will be provided as follows with reference to FIGS. 2-4.

STEP 2-1: A component attribute and meshes are extracted from the component attribute data 113 and the mesh data 114.

STEP 2-2: A cell of a high potential component is extracted from the data extracted in STEP 2-1 and the distance 0.0 is inputted. Also, 0 is inputted to a current identification number.

STEP 2-3: The current layer identification number is incremented by 1 to obtain a new current identification number N. Cells whose layer identification number is N−1 are extracted from the layer map data 115.

STEP 2-4: Whether or not the cells extracted in STEP 2-3 neighbor a space cell is checked and a list is made. For example, in the case of the example two-dimensional meshes shown (mesh size=1) in FIG. 3, the cells 304 to 308 neighbor a group of cells 301 to which an attribute of a high potential component is given. Thus, these cells 304 to 308 are listed. If a space cell neighbors a high potential component, data obtained by combining a cell identification number of the space cell and the layer identification number 1 is registered on the layer map data 115. Also, the distance of the layer identification number 1 or a distance from a surface of a high potential component to the center of the space cell is registered on the layer data 116. In FIG. 3, the cell 304 neighbors the high potential component 301, and the distance from the high potential component to the center of the cell is 0.5. In an example of this STEP 2-4 shown in FIG. 4 wherein a layer number is entered in a cell, the cells 404 to 407 are extracted.

STEP 2-5: Among cells neighboring all the cells extracted in STEP 2-4, all cells having a shortest distance from the cells listed in STEP 2-4 are identified. Subsequently, data obtained by combining the identified cells with the layer identification number N is registered on the layer map data 115, and the shortest distance is registered on the layer data 116. The range of the shortest distance may include a predetermined tolerance. STEP 2-3 to STEP 2-5 are repeated until the shortest distance exceeds the insulation distance of a spatial path. In FIG. 8 which illustrates an example layer data, the tolerance is 0.1 mm, a distance corresponding to the layer identification number 5 is 0.4 to 0.6 mm, and the representative distance is 0.5 mm. By making the range larger, repetitive execution of STEP 2-3 to STEP 2-5 can be reduced.

Next, the distance extraction section 108 will be explained with reference to FIGS. 5 to 7, and FIGS. 14 to 15. The processes of the distance extraction section 108 will be explained as follows.

STEP 3-1: A cell identification number of a space cell neighboring a cell of a conductive component is extracted from the mesh data 114. In FIG. 6, a layer identification number is entered in a cell. For example, the cell 601 is the space cell neighboring a cell of the conductive component 302.

STEP 3-2: The layer identification number which is equal to the cell identification number extracted in STEP 3-1 is extracted from the layer map data 115.

STEP 3-3: A distance which is equal to the layer identification number extracted in STEP 3-2 or a representative distance is extracted from the layer data 116.

STEP 3-4: The distance or the representative distance extracted in STEP 3-3 is outputted to the distance condition determination section 109.

In FIG. 7, a layer identification number which is equal to a cell identification number is extracted from the layer map data 115. Subsequently, a representative distance which is equal to the layer identification number is extracted from the layer data 116, and is entered in some cells.

Next, the distance condition determination section 109 will be explained. With use of a distance condition inputted from the distance condition data 117, the distance condition determination section 109 determines whether a distance inputted by the distance extraction section 108 or a representative distance satisfies the distance condition. Subsequently, a cell identification number of a space cell neighboring a conductive component is outputted to a component surface area and the path extraction section 118, together with determination results.

Next, the component surface area extraction section 110 will be explained as follows. The processes of the component surface area extraction section 110 will be described as follows.

STEP 4-1: From cell identification numbers of space cells neighboring a conductive component inputted from the distance condition determination section 109 and from determination results, an identification number of a space cell neighboring a conductive component that the determination results do not meet the distance condition is extracted.

STEP 4-2: A cell of a conductive component neighboring an identification number of the space cell extracted in STEP 4-1 is extracted from the component attribute data 113 and the mesh data 114.

STEP 4-3: A surface identification number which is common between the space cells extracted in the STEP 4-1 and the cells of the conductive component extracted in STEP 4-2 is extracted from the mesh data 114.

STEP 4-4: The surface identification number extracted in STEP 4-3 is outputted to the determination result display section 111.

Next, the path extraction section 118 will be explained with reference to FIG. 10 to FIG. 11. The processes of the path extraction section 118 will be described as follows.

STEP 5-1: From identification numbers of space cells neighboring a conductive component inputted from the distance condition determination section 109 and from determination results, a cell identification number of a space cell neighboring a conductive component that the determination results do not satisfy the distance condition is extracted. In the case of FIG. 10, the cell 1001 is extracted as an example.

STEP 5-2: A layer identification number which is equal to the cell identification number extracted in STEP 5-1 is extracted from the layer map data 115. In the case of FIG. 10, the layer identification number 19 is extracted as an example.

STEP 5-3: A list of layer identification numbers smaller than the layer identification number extracted in STEP 5-2 is extracted.

STEP 5-4: Cells neighboring the cell identification number of STEP 5-1 are extracted from the list of layer identification numbers extracted in STEP 5-3. In the case of FIG. 10 (the layer identification numbers in the figure is the same as that in FIG. 6), if the layer identification number 19 is extracted in STEP 5-2, a layer identification number of the cell 1002 which is equal to or less than 18 are extracted in STEP 5-3. In STEP 5-4, the layer identification number 14 is extracted. Subsequently, whether there is the cell extracted in STEP 5-4 or not is checked. If there is, whether the cell is for a high potential product or not is checked. If the cell is for a high potential component, STEP 5-5 is performed. If there is not, STEP 5-2 to STEP 5-3 are repeated with the cell identification number as an input to STEP 5-2.

STEP 5-5: A path connecting all the cells extracted in STEP 5-4 and the length (distance) of the path are determined and outputted to the determination result display section 111. The line 1006 in FIG. 10 is an example path connecting all the cells extracted in STEP 5-4. FIG. 11 is an example path which can be extracted by the path extraction section 118.

Next, the display condition input section 119 will be explained. The display condition input section 119 prompts a user to input information on whether paths not satisfying a distance condition should be displayed on the screen or not. Subsequent to an input of a distance condition by the user, whether paths not satisfying a distance condition should be displayed or not is outputted to the determination result display section 111.

Next, the determination result display section 111 will be explained. The determination result display section 111 extracts from the mesh data 114 a surface which is equal to the surface identification number inputted from the component surface area extraction section 110, and draws a surface extracted from the 3D CAD data 112. This drawing method uses such a method as highlight display or painting out red. FIG. 10 shows an example two-dimensional display. An area obtained by projecting a portion of a conductive component not satisfying a distance condition on a surface of a conductive component of 3D CAD or a coordination list of a portion of a conductive component not satisfying a distance condition may be displayed during this drawing.

Also, if an input to display paths not satisfying the distance condition is given to the display condition input section 119, paths not satisfying the distance condition are comprehensively displayed. FIG. 11 shows an example two-dimensional display. During this drawing, a three-dimensional area not satisfying the distance condition may be comprehensively displayed.

In this embodiment, whether an insulation distance condition is satisfied or not is determined by using a distance between a space cell neighboring a high potential component and another space cell neighboring a conductive component. However, the insulation distance condition or distance used for determination may be corrected for improved accuracy by calculating a geometric shortest path from the center of a space cell neighboring a high potential component or a conductive component to a surface of the high potential component or the conductive component.

This invention is characterized by the fact that even when there is an insulation component between a high potential component and a conductive component, it is possible to comprehensively determine both a spatial path bypassing the insulation component and a distance of the bypassing spatial path. Also, this invention enables to inform a user of a range of a conductive component in need of a shape change by displaying a surface area of the conductive component not satisfying an insulation distance condition.

Furthermore, if an attribute of a high potential component is replaced with that of a conductive component, it is possible to let a user know a range of the conductive component in need of a shape change by displaying a surface area of the high potential component not satisfying an insulation distance condition.

The method mentioned above enables to check an insulation distance between a high potential component and each of conductive components by making a round. Therefore, this method is suitable for a case wherein there is a plurality of conductive components. This method can also be applied to an electric product on which a plurality of electric components is mounted.

Also, according to this invention, if there is a plurality of high potential components and if an insulation distance check among one component to another is necessary, it is possible to conduct an insulation distance check within time for making a round if all the high potential components are arranged in parallel.

In this embodiment, only an example of application to an insulation distance check was explained. However, in the case of verification wherein an importance is put on a distance of a spatial path bypassing an insulation component, results of this embodiment can be included as an index of the verification through sufficient comparison verification between calculation and actual device.

What is claimed is:

1. An insulation distance check device comprising:
   a component designation section designating a high potential component, a conductive component and an insulation component to 3D CAD (3-Dimensional Computer Aided Design) data;
   a distance condition providing section providing a distance condition associated with a first distance between at least two components among the high potential component, the conductive component and the insulation component;
   a layer map creation section superimposing on the 3D CAD data a layer spatially surrounding the high potential component and creating a layer map associating the layer with the first distance;
   a conductive component-associated distance determination section determining a second distance associated with the layer contacting with a portion of the conductive component, the second distance being a distance between the high potential component and the portion of the conductive component;
   a distance condition comparison section comparing the second distance with the distance condition;
   a display section characteristically displaying at least one region occupied by said portion of the conductive component, on which the second distance having been determined to dissatisfy the distance condition is based; and a path connecting the high potential component and the conductive component;
   a modifying section modifying the conductive component based on the at least one region occupied by said portion of the conductive component; and
   wherein the conductive component modified based on the at least one region occupied by said portion of the conductive component is physically made.

2. The insulation distance check device of claim 1, wherein the distance condition providing section provides the distance condition comparison section with the distance condition based on a designation from the outside.

3. The insulation distance check device of claim 1, wherein the distance condition providing section calculates the distance condition based on an externally designated electric condition and provides the distance condition comparison section with the calculated distance condition.

4. The insulation distance check device of claim 1, further comprising a mesh creation section creating meshes.

5. The insulation distance check device of claim 4, wherein the mesh creation section creates orthogonal lattice-type meshes.

6. The insulation distance check device of claim 1, wherein the modifying section is configured to modify a shape of the conductive component based on the at least one region occupied by said portion of the conductive component.

7. The insulation distance check device of claim 1, further comprising:
   a component surface extraction section extracting a surface area on the conductive component not satisfying the distance condition.

8. An insulation distance check device comprising:
   a unit which designates a high potential component, a conductive component and an insulation component to 3D CAD (3-Dimensional Computer Aided Design) data;
   a unit which provides a distance condition associated with a first distance between at least two components among the high potential component, the conductive component and the insulation component;

a unit which superimposes on the 3D CAD data a layer spatially surrounding the high potential component and creates a layer map associating the layer with the first distance;

a unit which determines a second distance associated with the layer contacting with a portion of the conductive component, the second distance being a distance between the high potential component and the portion of the conductive component;

a unit which compares the second distance with the distance condition; and a unit which characteristically displays at least one region occupied by said portion of the conductive component, on which the second distance having been determined to dissatisfy the distance condition is based; and a path connecting the high potential component and the conductive component;

wherein the conductive component is modified based on the at least one region occupied by said portion of the conductive component and is physically made.

9. The insulation distance check device of claim 8, wherein the unit which provides a distance condition provides the unit which compares the determined distance with the distance condition with the distance condition based on a designation from the outside.

10. The insulation distance check device of claim 8, wherein the unit which provides a distance condition calculates the distance condition based on an externally designated electric condition and provides the unit which compares the determined distance with the distance condition with the calculated distance condition.

11. The insulation distance check device of claim 8, further comprising a unit which creates meshes.

12. The insulation distance check device of claim 11, wherein the unit which creates meshes creates orthogonal lattice-type meshes.

13. The insulation distance check device of claim 8, further comprising:

a unit which extracts a surface area on the conductive component not satisfying the distance condition.

14. An insulation distance check method comprising:

designating a high potential component, a conductive component and an insulation component to 3D CAD (3-Dimensional Computer Aided Design) data;

providing a distance condition associated with a first distance between at least two components among the high potential component, the conductive component and the insulation component;

superimposing on the 3D CAD data a layer spatially surrounding the high potential component and creating a layer map associating the layer with the first distance;

determining a second distance associated with the layer contacting with a portion of the conductive component, the second distance being a distance between the high potential component and the portion of the conductive component;

comparing the second distance with the distance condition;

displaying at least one region occupied by said portion of the conductive component, on which the second distance having been determined to dissatisfy the distance condition is based; and a path connecting the high potential component and the conductive component;

modifying the conductive component based on the at least one region occupied by said portion of the conductive component; and physically making the conductive component modified based on the at least one region occupied by said portion of the conductive component.

15. The insulation distance check method of claim 14, wherein modifying the conductive component comprises modifying a shape of the conductive component based on the at least one region occupied by said portion of the conductive component.

16. The insulation distance check method of claim 14, further comprising:

extracting a surface area on the conductive component not satisfying the distance condition.

17. The insulation distance check method of claim 16, wherein modifying the conductive component comprises modifying a shape of the surface area on the conductive component not satisfying the distance condition.

18. The insulation distance method of claim 14, wherein providing the distance condition comprises providing the distance condition based on a designation from the outside.

19. The insulation distance check method of claim 14, wherein providing the distance condition comprises calculating the distance condition based on an externally designated electric condition.

* * * * *